(12) United States Patent
Rimmington

(10) Patent No.: US 9,522,789 B1
(45) Date of Patent: Dec. 20, 2016

(54) CONTROLLING A CONVEYOR IN A MINING SYSTEM

(71) Applicant: Joy MM Delaware, Inc., Wilmington, DE (US)

(72) Inventor: Gareth Rimmington, Barnsley (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 14/802,302

(22) Filed: Jul. 17, 2015

(51) Int. Cl.
  *B65G 19/00* (2006.01)
  *B65G 43/00* (2006.01)
  *B65G 23/44* (2006.01)

(52) U.S. Cl.
  CPC ............... *B65G 43/00* (2013.01); *B65G 23/44* (2013.01)

(58) Field of Classification Search
  CPC ................................................. B65G 19/00
  USPC ................ 198/502.1, 717, 718, 807, 810.04, 813, 198/617
  See application file for complete search history.

(56) References Cited

U.S. PATENT DOCUMENTS

| | | | |
|---|---|---|---|
| 4,159,850 A | 7/1979 | Lobbe et al. | |
| 4,657,131 A * | 4/1987 | Brychta | B65G 23/44 198/810.02 |
| 5,131,528 A * | 7/1992 | Bandy, Jr. | B65G 23/44 198/813 |
| 5,624,162 A | 4/1997 | Guse et al. | |
| 5,641,058 A * | 6/1997 | Merten | B65G 23/44 198/810.04 |
| 5,647,640 A | 7/1997 | Heintzmann et al. | |
| 5,997,423 A * | 12/1999 | Kwon | B65G 23/44 198/810.04 |
| 6,029,799 A * | 2/2000 | Weigel | B65G 23/36 198/810.04 |
| 7,540,374 B2 | 6/2009 | Rathbun et al. | |
| 7,793,775 B2 * | 9/2010 | Rozenfeld | B65H 5/085 198/502.1 |
| 8,061,510 B2 * | 11/2011 | Tout | B65G 43/06 198/810.04 |
| 8,191,703 B2 * | 6/2012 | Tokhtuev | B65G 43/02 198/810.04 |
| 8,285,494 B2 * | 10/2012 | Vozner | 198/502.1 |
| 8,387,777 B2 * | 3/2013 | Tokhtuev | B65G 43/02 198/502.1 |

(Continued)

FOREIGN PATENT DOCUMENTS

GB  2072126  9/1981

*Primary Examiner* — Douglas Hess
(74) *Attorney, Agent, or Firm* — Michael Best & Friedrich LLP

(57) ABSTRACT

Controlling a distance between a first sprocket and a second sprocket in a conveyor. The control includes receiving a first signal from a first sensor related to an angular position of the first sprocket, determining a value for an angular position of the first sprocket based on the first signal, receiving a second signal from a second sensor related to an angular position of the second sprocket, determining a value for an angular position of the second sprocket based on the second signal, determining a relative difference in phase between the angular position of the first sprocket and the angular position of the second sprocket, and determining an amount of excess chain in the conveyor based on the relative difference in phase between the angular position of the first sprocket and the angular position of the second sprocket.

20 Claims, 12 Drawing Sheets

(56) References Cited

U.S. PATENT DOCUMENTS

| | | | |
|---|---|---|---|
| 8,550,236 B2 * | 10/2013 | Merten | B65G 23/44 198/502.1 |
| 8,636,140 B2 * | 1/2014 | Tout | B65G 23/44 198/814 |
| 8,783,446 B2 | 7/2014 | Martin | |
| 8,789,892 B2 * | 7/2014 | Niederriter | E21C 29/02 299/43 |
| 9,103,209 B2 * | 8/2015 | Saikia | E21C 27/02 |
| 9,221,617 B2 * | 12/2015 | Waller | B65G 23/44 |
| 2010/0270128 A1 | 10/2010 | Hill | |
| 2010/0270131 A1 | 10/2010 | Vasey | |
| 2013/0068594 A1 * | 3/2013 | Worthington et al. | |
| 2013/0341156 A1 * | 12/2013 | Vogeley, Jr. | |

\* cited by examiner

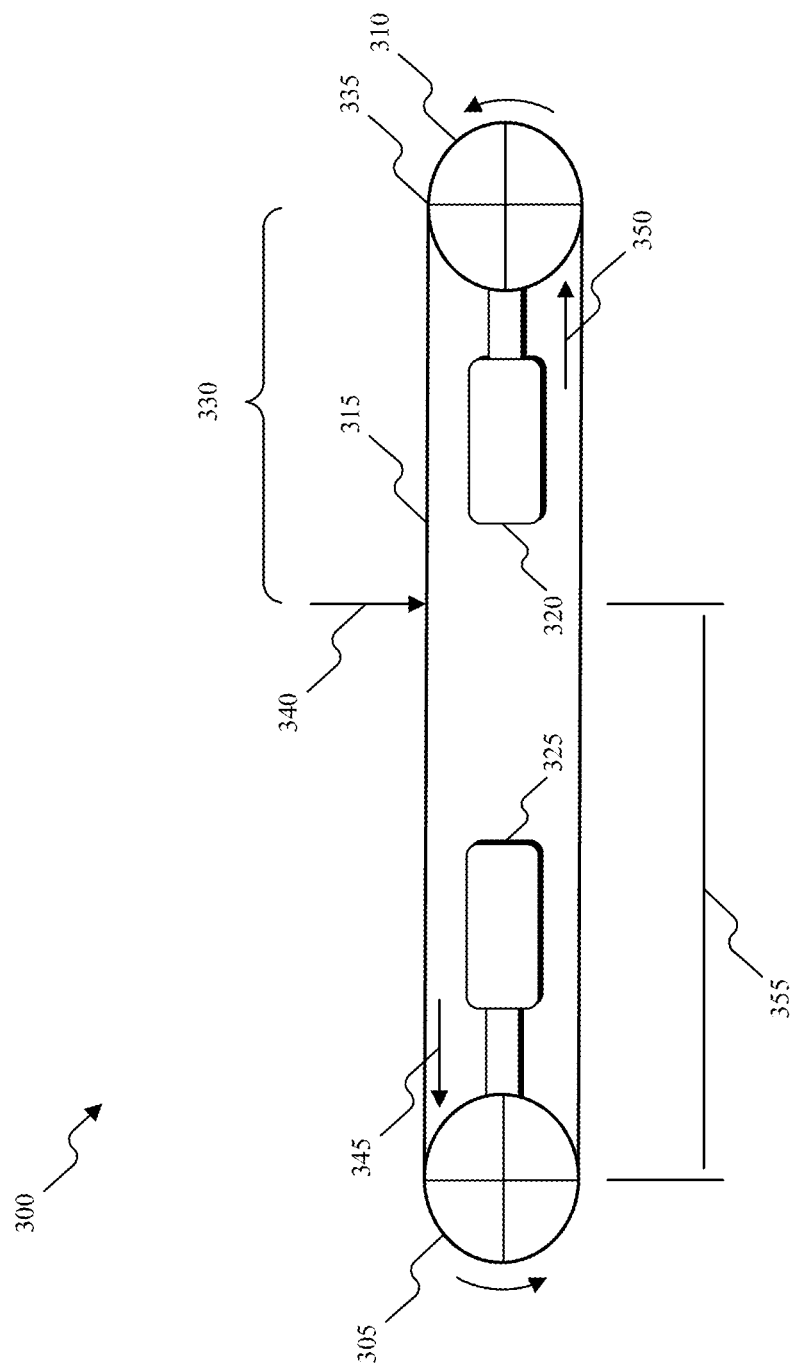

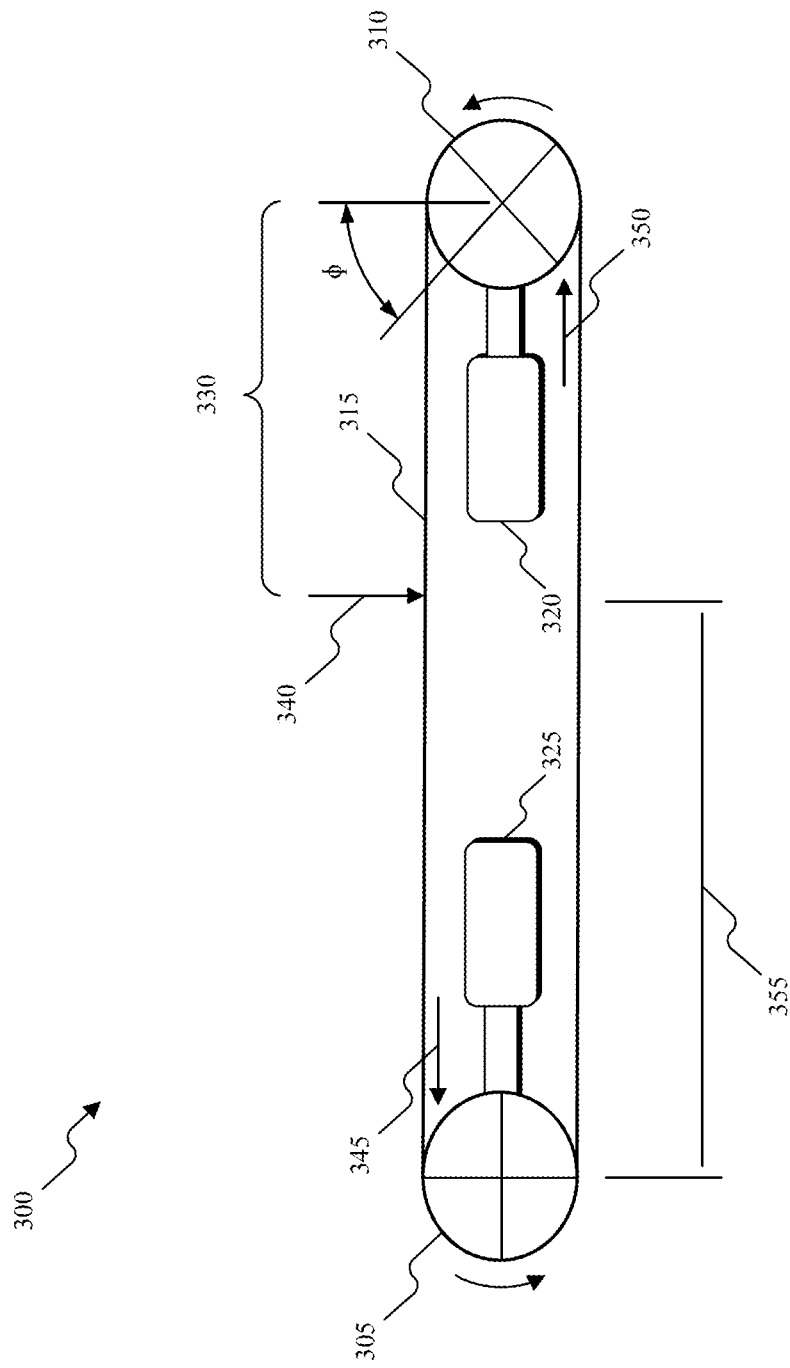

CONTROLLING A CONVEYOR IN A MINING SYSTEM

BACKGROUND

This invention relates to the control of a conveyor, such as an armored face conveyor ("AFC") or a beam stage loader ("BSL").

SUMMARY

Longwall mining systems include, among other things, a conveyor such as an AFC or BSL to transport a mined material (e.g., coal) from an area where the material is being mined to an area for processing (e.g., crushing, storage, etc.). AFCs include a first sprocket and a second sprocket around which a chain is provided. The chain is driven by one or more motors (e.g., a maingate motor, a tailgate motor, etc.), and the movement of the chain around the sprockets causes a conveyor to transport the mined material. Conventional conveyors that include an extendable return end frame use tensioning techniques to increase chain tension around the sprockets and minimize slack chain or zero tension conditions (e.g., the chain is equally tensioned throughout its length). The tensioning techniques include, for example, using a hydraulic cylinder to push the first sprocket away from the second sprocket. As the conveyor becomes loaded with mined material, the conveyor chain is subjected to stresses and strain which result in an amount of slack in the chain.

Conventional tensioning techniques rely upon direct measurements of chain tension (e.g., using a loadpin) or indirect measurements of chain tension that use, for example, motor power or another characteristic of a drive mechanism to determine an estimated chain tension. Such techniques are unreliable due to sensor damage or inaccuracy, and can also be expensive to implement. As a result, the control of the tension in the chain can also be unreliable and expensive to implement.

This invention relates to improved techniques for controlling a position of a first sprocket with respect to a position of a second sprocket to control an amount of excess chain (e.g., slack chain) in a conveyor. The invention includes systems and methods for determining an amount of excess chain in a chain of a conveyor or a portion of a conveyor in a mining system. A controller then adjusts (i.e., increases or decreases) a distance between the first sprocket and the second sprocket to adjust chain tension based on the determined amount of excess chain. The amount of excess chain can be determined based on a relative phase difference between an angular position of the first sprocket and an angular position of the second sprocket. After the amount of excess chain has been determined, the distance between a first sprocket and a second sprocket is adjusted to take up the amount of excess chain.

In one embodiment, the invention provides a conveyor for a mining system. The conveyor includes a first sprocket, a second sprocket, a chain, a drive mechanism, a first sensor, a second sensor, and a controller. The chain is associated with the first sprocket and the second sprocket. The drive mechanism is coupled to the first sprocket or the second sprocket and is operable to drive the first sprocket or the second sprocket. The first sensor is operable to generate a first signal related to an angular position of the first sprocket. The second sensor is operable to generate a second signal related to an angular position of the second sprocket. The controller includes a processor and a memory and is operable to receive the first signal from the first sensor, determine a value for the angular position of the first sprocket based on the first signal, receive the second signal from the second sensor, and determine a value for the angular position of the second sprocket based on the second signal. The controller is also operable to determine a relative difference in phase between the angular position of the first sprocket and the angular position of the second sprocket, determine an amount of excess chain based on the relative difference in phase between the angular position of the first sprocket and the angular position of the second sprocket, and generate a control signal for controlling a distance between the first sprocket and the second sprocket based on the amount of excess chain.

In another embodiment, the invention provides a method of controlling a distance between a first sprocket and a second sprocket in a conveyor of a mining system. The method includes receiving a first signal from a first sensor related to an angular position of the first sprocket, determining a value for an angular position of the first sprocket based on the first signal, receiving a second signal from a second sensor related to an angular position of the second sprocket, determining a value for an angular position of the second sprocket based on the second signal, determining a relative difference in phase between the angular position of the first sprocket and the angular position of the second sprocket, determining an amount of excess chain in the conveyor based on the relative difference in phase between the angular position of the first sprocket and the angular position of the second sprocket, and generating a control signal for controlling a distance between the first sprocket and the second sprocket based on the amount of excess chain.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Independent aspects of the invention will become apparent by consideration of the detailed description and accompanying drawings.

BRIEF DESCRIPTION OF THE DRAWINGS

FIGS. 4-9 illustrate a control of an amount of excess chain in a conveyor based on sprocket phase.

DETAILED DESCRIPTION

The invention described herein relates to the control of a conveyor in a mining system. The conveyor includes, for example, armored face conveyors ("AFCs") or beam stage loaders ("BSLs"). For descriptive purposes, the invention is described herein with respect to embodiments that include AFCs. AFCs include a first sprocket, a second sprocket, a chain, one or more drive mechanisms (e.g., motors), one or more hydraulic cylinders, and a controller. The controller is operable or configured to determine or calculate an amount of excess chain in the conveyor based on the relative sprocket phases of the first sprocket and the second sprocket. The phase of each of the first sprocket and the second sprocket can be determined with respect to a top dead center ("TDC") position of each sprocket. With the phase angle of each sprocket relative to TDC, a difference in phase between the first sprocket and the second sprocket is determined. The relative difference in phase is used to determine or calculate an extension of the bottom portion of the chain. An extension of the top portion of the chain is determined or calculated based on a torque associated with the first sprocket and a distance between the first sprocket and a loading point of the conveyor. A total excess length of chain in the conveyor is determined or calculated as the sum of the extension of the top portion of the chain and the extension of the bottom portion of the chain. The controller is also operable or configured to automatically control the relative positions of the first sprocket and second sprocket based on the determined amount of excess chain.

Figure 1:
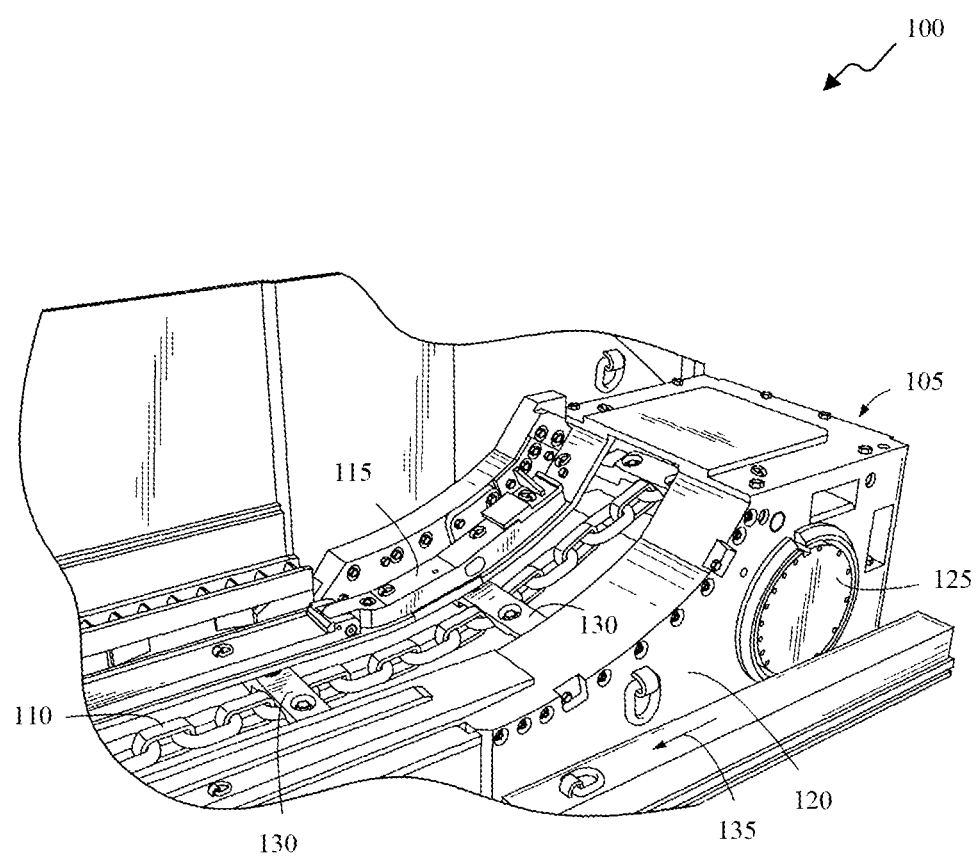
FIG. 1 illustrates a portion of a chain conveyor including an end frame.

FIG. 1 illustrates a portion of a longwall conveyor 100. The conveyor 100 includes a return end 105, a conveying element or chain 110 that travels between the return end 105 and a discharge portion of a longwall mining system, and a sensor assembly 115 proximate to the return end 105. The chain 110 is driven by a drive mechanism, such as a variable speed motor, associated with the discharge portion. The return end 105 includes a frame 120, a sprocket or take-up shaft 125 mounted on the frame 120, and at least one hydraulic cylinder (not shown). The frame 120 moves with respect to the discharge portion based on the extension and retraction of the hydraulic cylinder. The chain 110 passes around the take-up shaft 125 to travel in a continuous loop between the discharge portion and the return end 105. The chain 110 includes a plurality of flight members or bars 130 mounted on the chain 110 and spaced apart by a first distance in a direction of travel 135 of the chain 110.

Figure 2:
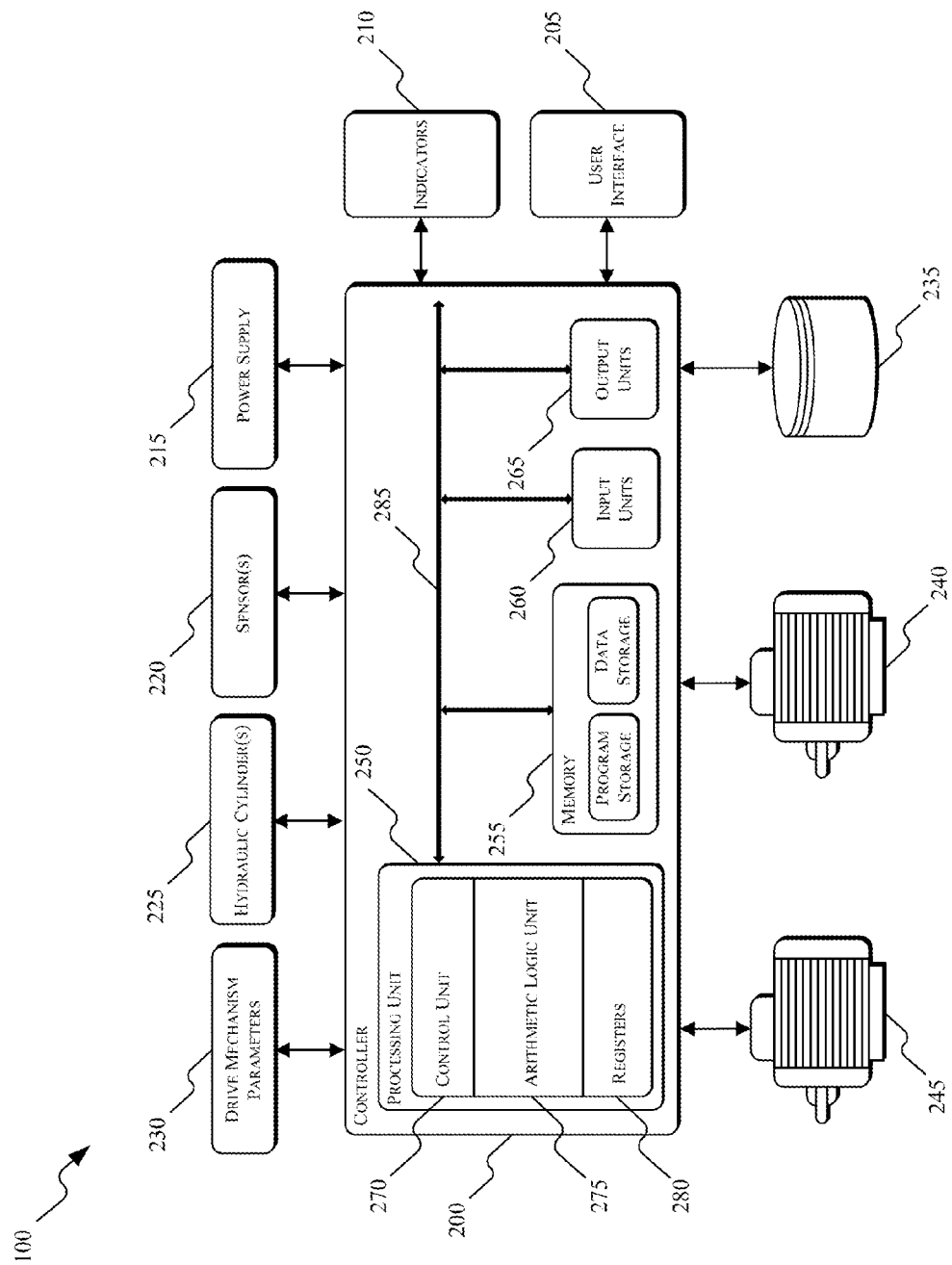
FIG. 2 illustrates a controller for a chain conveyor according to an embodiment of the invention.

FIG. 2 illustrates a controller 200 associated with the conveyor 100. The controller 200 is connected or coupled to a variety of additional modules or components, such as a user interface module 205, one or more indicators 210, a power supply module 215, one or more sensors 220, one or more hydraulic cylinders 225, a drive mechanism or motor parameters module 230, a data store or database 235, a first drive mechanism and drive 240 (e.g., associated with the maingate), and a second drive mechanism and drive 245 (e.g., associated with the tailgate). In some embodiments, the first drive mechanism and drive 240 includes a first motor and a first motor drive, and the second drive mechanism and drive 245 includes a second motor and second motor drive. In some embodiments, a first motor and first motor drive 240 and the second motor and second motor drive 245 each include switchgear assemblies. Embodiments of the invention described herein are described with respect to the drive mechanisms and drives being motors and motor drives. The one or more sensors 220 are, for example, tachometers configured to measure or sense a characteristic of the first sprocket and/or the second sprocket (e.g., a socket rotational position, a sprocket rotational speed, a sprocket rotational acceleration, etc.), proximity sensors configured to measure or sense a characteristic of the chain (e.g., a chain position, a chain speed, a chain acceleration, etc.), power transducers within the conveyor 100 configured to measure or sense an electrical characteristic (e.g., current, voltage, power factor, torque, speed, input power, output power, etc.), load cells, etc. The controller 200 includes combinations of hardware and software that are programmed, configured, and/or operable to, among other things, control the operation of the conveyor 100, control the position of the one or more hydraulic cylinders 225, activate the one or more indicators 210 (e.g., a liquid crystal display ["LCD"]), monitor the operation of the conveyor 100, etc.

In some embodiments, the controller 200 includes a plurality of electrical and electronic components that provide power, operational control, and protection to the components and modules within the controller 200 and/or the conveyor 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor chip, is a field-programmable gate array ("FPGA"), is an application specific integrated circuit ("ASIC"), etc.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software and instructions included in the implementation of the conveyor 100 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The drive mechanism or motor parameters module 230 is connected to or associated with the motors and drives 240, 245 that are coupled to the first sprocket and/or the second sprocket. The parameters module 230 is configured to receive signals associated with one or more parameters (e.g., current, voltage, power factor, torque, speed, input power, output power, etc.) of the motors 240, 245. In some embodiments, the parameters module 230 receives signals related to the motor parameters. In other embodiments, the parameters module 230 includes or is connected to the one or more sensors 220 for sensing the motor parameters.

The motors 240, 245 are controlled by control signals received from the controller 200. The motors 240, 245 are also coupled to gear reduction boxes or transmissions to reduce the rotational speed of the motors to a rotational speed appropriate for the sprockets and conveyor 100. In some embodiments, the controller 200 is configured to control the motors 240, 245 and the conveyor 100 autonomously using the sensors 220 and one or more stored programs or modules. In other embodiments, the controller 200 is configured to control the motors and the conveyor 100 based on a combination of manual inputs and automatic controls. The one or more hydraulic cylinders 225 also receive control signals from the controller 200, and selectively extend or retract the return end frame 105 (e.g., change the position of the first sprocket, the second sprocket, etc.) based on the control signals from the controller 200. The controller 200 also monitors the motors and the one or more hydraulic cylinders 225 to determine related characteristics. For example, the controller 200 can monitor or sense electrical characteristics of the one or more motors, the position of the one or more hydraulic cylinders 225 (e.g., an extension of the one or more hydraulic cylinders), etc. Although a single controller 200 is illustrated, in other constructions, the controller 200 may be separated into a plurality of controllers. For example, the controller 200 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor 100.

The user interface module 205 is used to control or monitor the conveyor 100 or the mining system. For example, the user interface module 205 is operably coupled to the controller 200 to control the speed of the conveyor, the speed of the one or more motors, etc. The user interface module 205 can include a combination of digital and analog input or output devices required to achieve a desired level of control and monitoring for the conveyor 100. For example, the user interface module 205 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface module 205 can also be configured to display conditions or data associated with the conveyor 100 in real-time or substantially real-time. For example, the user interface module 205 is configured to display measured electrical characteristics of the conveyor 100, the status of the conveyor 100, chain tensions, fault conditions (e.g., slack chain, zero tension chain, etc.), an amount of mined material on the conveyor, etc. In some embodiments, the user interface module 205 is controlled in conjunction with the one or more indicators 210 (e.g., LEDs) to provide visual indications of the status or conditions of the conveyor 100.

As previously indicated, in some embodiments, the controller 200 is configured to reduce the amount of excess chain in the conveyor 100 by automatically controlling the linear position of the one or more hydraulic cylinders 225 to control tension in the chain. The controller 200 is also configured to receive signals from the one or more sensors 220 associated with the one or more motors, the one or more hydraulic cylinders 225, one or more chains, or other components of the conveyor 100. The signals from the sensors 220 are related to, for example, a sprocket rotational position, motor torque, hydraulic cylinder position, etc. The controller 200 then processes and analyzes the signals to determine the amount of excess chain in the conveyor 100, as described below.

In some embodiments, the controller 200 determines an amount of excess chain in the conveyor 100 and controls the position of the one or more hydraulic cylinder 225 based on the amount of excess chain. Depending on the determined amount of excess chain in the conveyor, the one or more hydraulic cylinders 225 are controlled to increase or decrease the distance between the first sprocket and the second sprocket to account for the amount of excess chain. By automatically controlling the position of the one or more hydraulic cylinders 225 based on the determined amount of excess chain, the excess chain in the conveyor 100 can be reduced or eliminated.

Figure 3A:
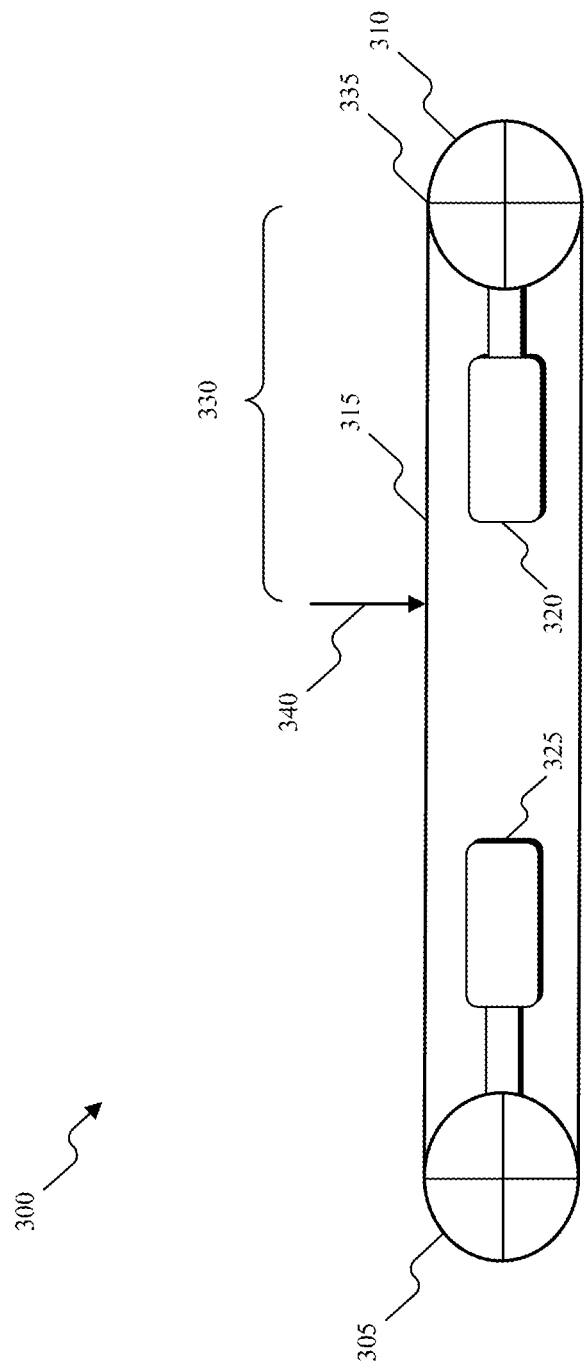
FIGS. 3A, 3B, and 3C are diagrams illustrating generalized conveyors and a "danger zone" of the conveyors.
Figure 3B:
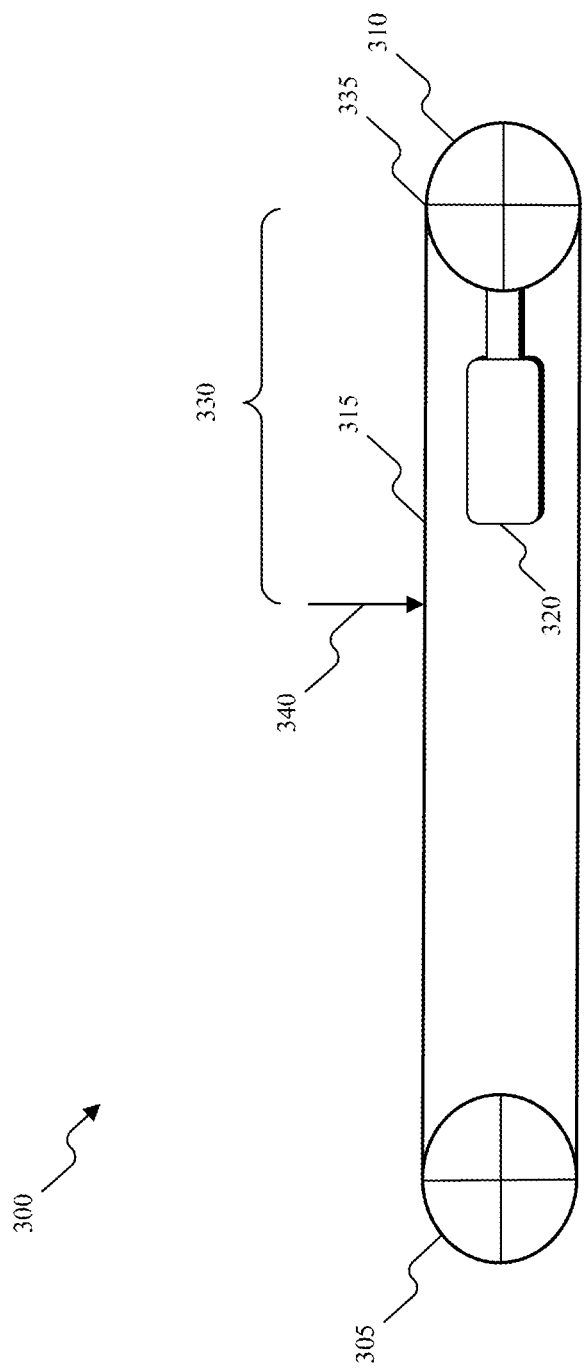
Figure 3C:
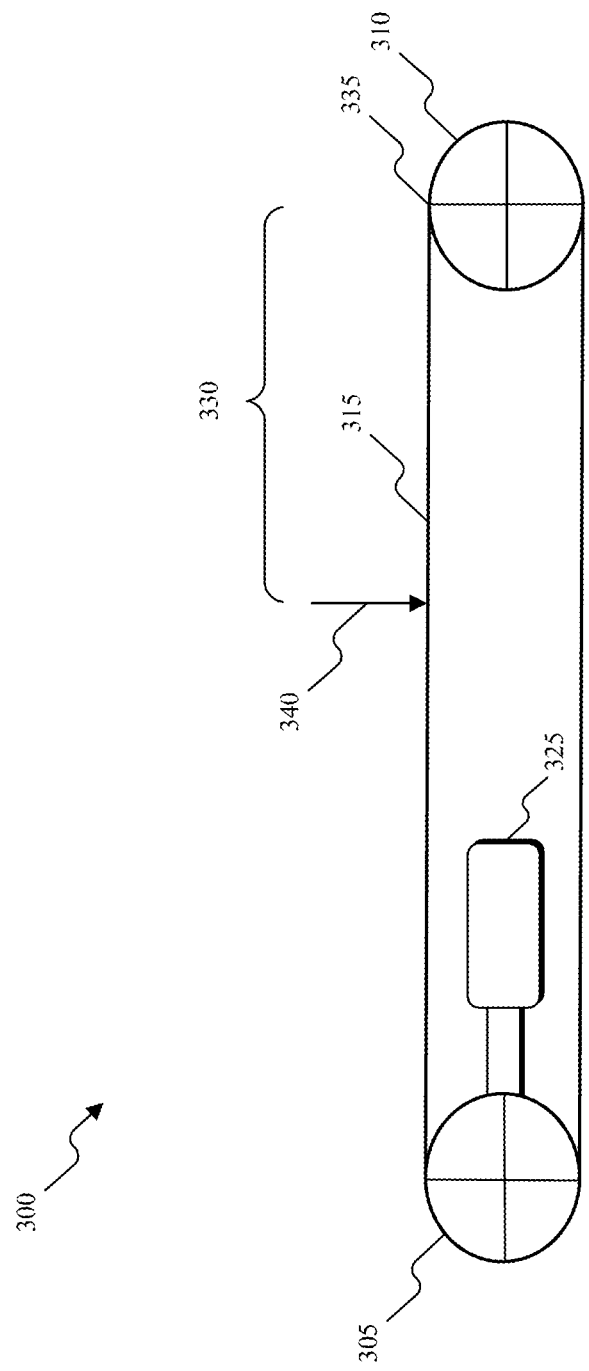

A generalized illustration of a conveyor 300 for a mining system is illustrated in FIG. 3A. The conveyor 300 includes a first sprocket or maingate sprocket 305, a second sprocket or tailgate sprocket 310, a chain 315, a first hydraulic cylinder 320, a second hydraulic cylinder 325, and a monitored zone or "danger zone" 330. The zone 330 is illustratively shown as an area between a top-dead-center ("TDC") point 335 of the second sprocket 310 and a loading point 340 (e.g., the point on the top portion of the chain where material is being loaded onto the conveyor). The zone 330 represents the portion of the chain 315 that is most likely to experience a slack chain (i.e., low-tension) condition. The amount of excess chain or slack in the chain 315 in the zone 330 can be determined and used to control the relative positions of the first sprocket 305 and the second sprocket 310. The relative positions of the sprockets can be modified by controlling the first hydraulic cylinder 320 and/or the second hydraulic cylinder 325. FIGS. 3B and 3C illustrate conveyors according to embodiments of the invention that include one hydraulic cylinder connected to either the first sprocket 305 or the second sprocket 310.

FIGS. 4-9 illustrate the control of the relative positions of the first sprocket 305 and the second sprocket 310. The conveyor 300 illustrated in FIGS. 4-9 includes the first hydraulic cylinder 320 and the second hydraulic cylinder 325, as described above with respect to FIG. 3A. In some embodiments, the conveyor 300 only includes one of the hydraulic cylinders 320 and 325, as described above with respect to FIGS. 3B and 3C. In addition to the above description of the conveyor 300, the conveyor 300 illustrated in FIGS. 4-9 also includes an indication 345 of a force that is applied to the chain 315 by the first or maingate sprocket 305, an indication 350 of a force that is applied to the chain 315 by the second or tailgate sprocket 310, and a length 355 of the chain 315 that is loaded with material (e.g., from the loading point 340 to the maingate sprocket 305). In the illustrated embodiment, the first sprocket 305 and the second sprocket 310 are rotating in a counterclockwise manner. FIG. 4 illustrates the conveyor 300 in an unloaded condition where no material has yet been loaded onto the chain 315.

Figure 6:
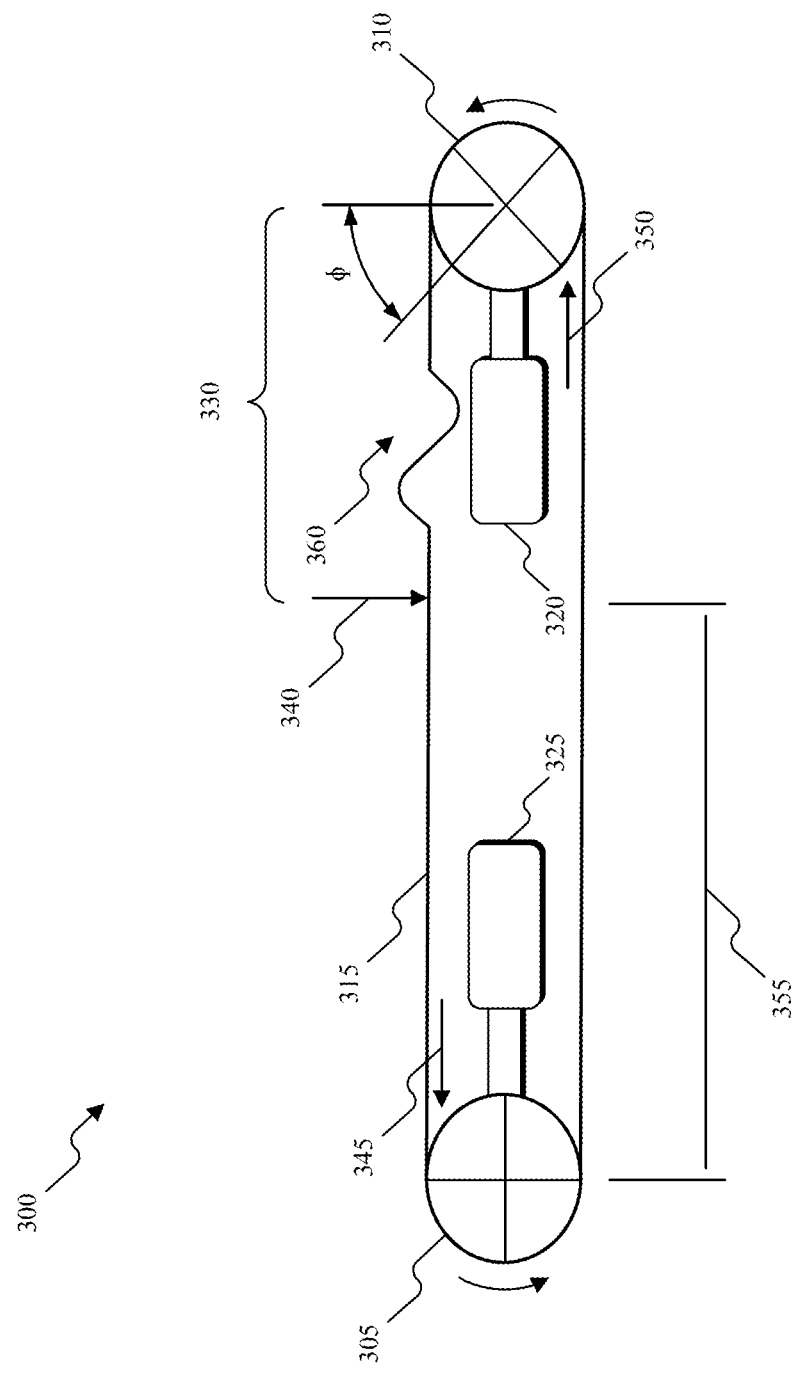

FIG. 5 illustrates the conveyor 300 after material has been loaded onto the chain 315 at the loading point 340. As a result of the material that is loaded onto the chain 315, the first sprocket 305 encounters a greater resistance to the rotation of the sprocket 305. The resistance to the rotation of the first sprocket 305 causes the first sprocket 305 to rotate at a lower speed than the second sprocket 310. As a result of this speed differential, the second sprocket 310 rotates through a larger angular distance as compared to the first sprocket 305 for a given period of time. This difference in the amount of angular rotation between the first sprocket 305 and the second sprocket 310 corresponds to a difference in relative angular phase, $\Phi$, between the first sprocket 305 and the second sprocket 310. The difference in relative angular phase, $\Phi$, results in excess chain 360 being present in the zone 330, as illustrated in FIG. 6.

Figure 7:
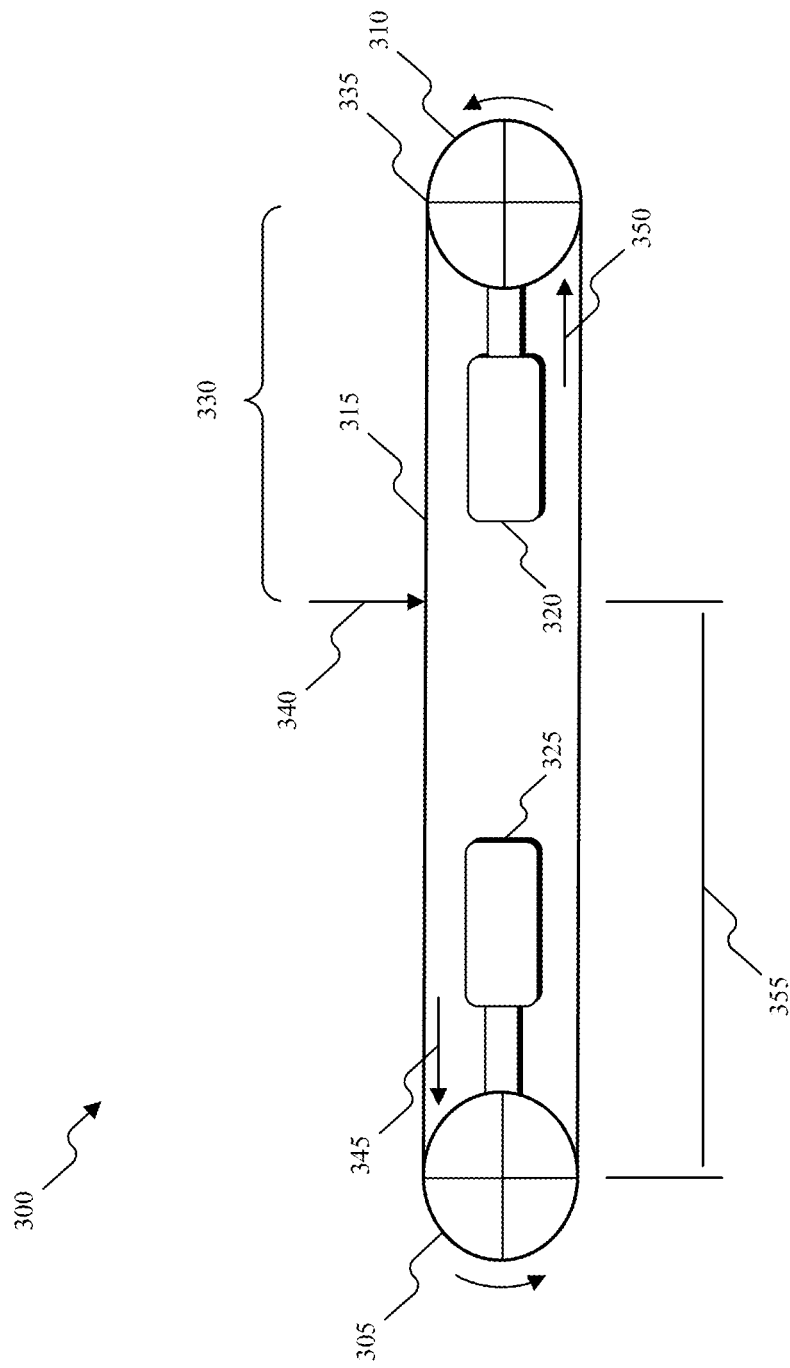

The excess chain 360 is detected by the controller 200, as described below. After the controller 200 has detected the excess chain 360 and determined how much excess chain is present, the controller 200 generates control signals to control one or both of the first hydraulic cylinder 320 and the second hydraulic cylinder 325 to modify (e.g., increase) the distance between the first sprocket 305 and the second sprocket 310. Modifying the distance between the first sprocket 305 and the second sprocket 310 takes up the excess chain 360, as illustrated in FIG. 7. As also illustrated in FIG. 7, the relative phase difference, $\Phi$, between the first sprocket 305 and the second sprocket 310 has been eliminated. In some embodiments, the modification to the distance between the first sprocket 305 and the second sprocket 310 functions to automatically remove the phase difference, $\Phi$ (i.e., a mechanical correction results in the phase difference becoming about zero). In other embodiments, modifying the distance between the first sprocket 305 and the second sprocket 310 does not mechanically correct for the phase difference. Rather, after the distance between the first sprocket and the second sprocket has been modified to take up the excess chain 360, the TDC of the second sprocket 310 is redefined to its current position. As a result, the first sprocket 305 and the second sprocket 310 are again in phase with one another. The controller 200 continues to determine if further modifications to the distance between the first sprocket 305 and the second sprocket 310 are necessary.

Figure 8:
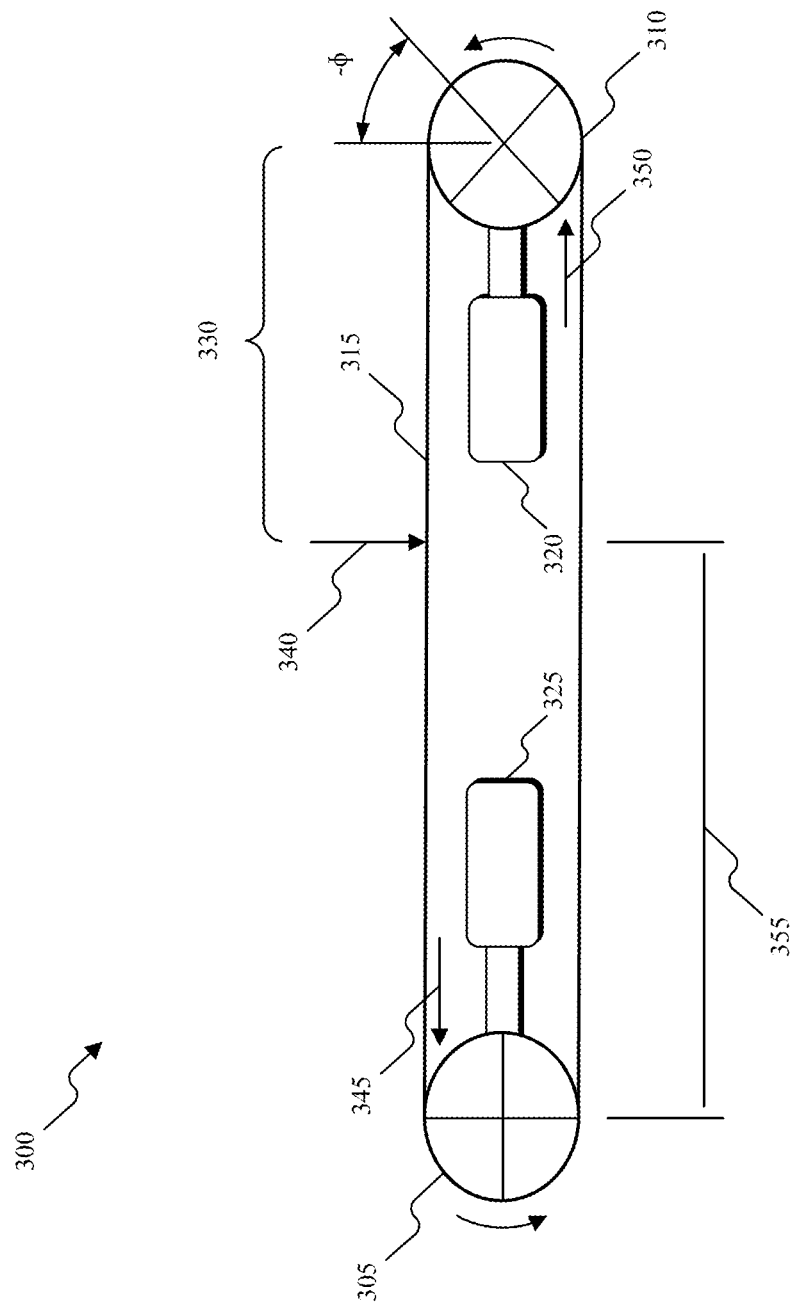
Figure 9:
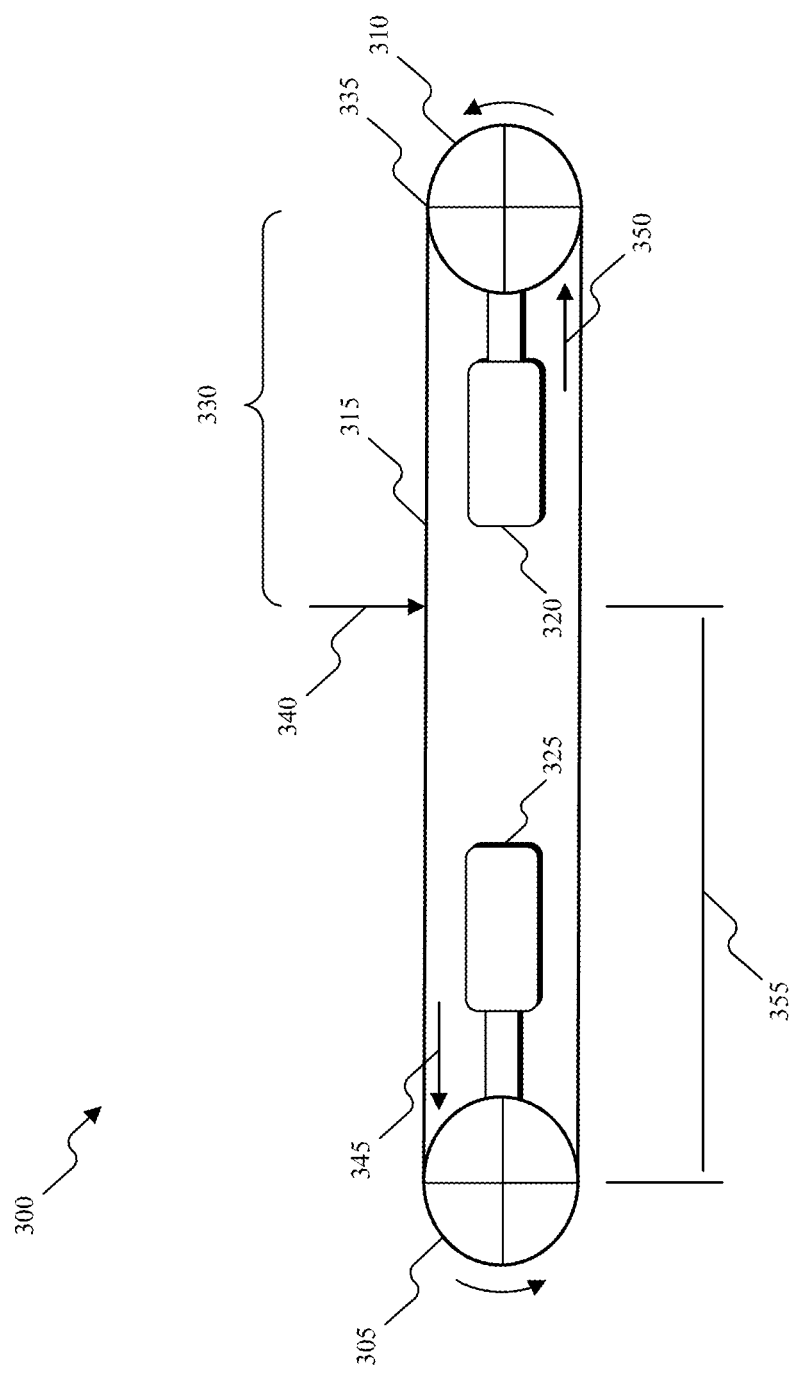

Following the phase correction described above with respect to FIGS. 6 and 7, when the conveyor 300 becomes less loaded or unloaded, it is possible for a phase difference to again appear between the first sprocket 305 and the second sprocket 310. In this instance, however, the phase difference will be in the opposite direction from when the conveyor went from an unloaded condition to a loaded condition. This phase difference is illustrated in FIG. 8 as a phase difference, $-\Phi$. Correcting for the phase difference, $-\Phi$, is achieved in a similar manner as to what was described above with respect to FIGS. 6 and 7. After the amount of excess chain is determined (e.g., the amount of excess chain can have a negative value corresponding to too much tension in the chain 315), the distance between the first sprocket 305 and the second sprocket 310 is modified (e.g., reduced). Modifying the distance between the first sprocket 305 and the second sprocket 310 reduces the tension of the chain 315 and eliminates the relative phase difference, $-\Phi$, between the first sprocket 305 and the second sprocket 310, as shown in FIG. 9. In some embodiments, the modification to the distance between the first sprocket 305 and the second sprocket 310 functions to automatically remove the phase difference, $-\Phi$ (i.e., a mechanical correction results in the phase difference becoming about zero). In other embodiments, modifying the distance between the first sprocket 305 and the second sprocket 310 does not mechanically correct for the phase difference. Rather, after the distance between the first sprocket and the second sprocket has been modified, the TDC of the second sprocket 310 is redefined to its current position. As a result, the first sprocket 305 and the second sprocket 310 are again in phase with one another. The controller 200 continues to determine if further modifications to the distance between the first sprocket 305 and the second sprocket 310 are necessary.

Figure 10:
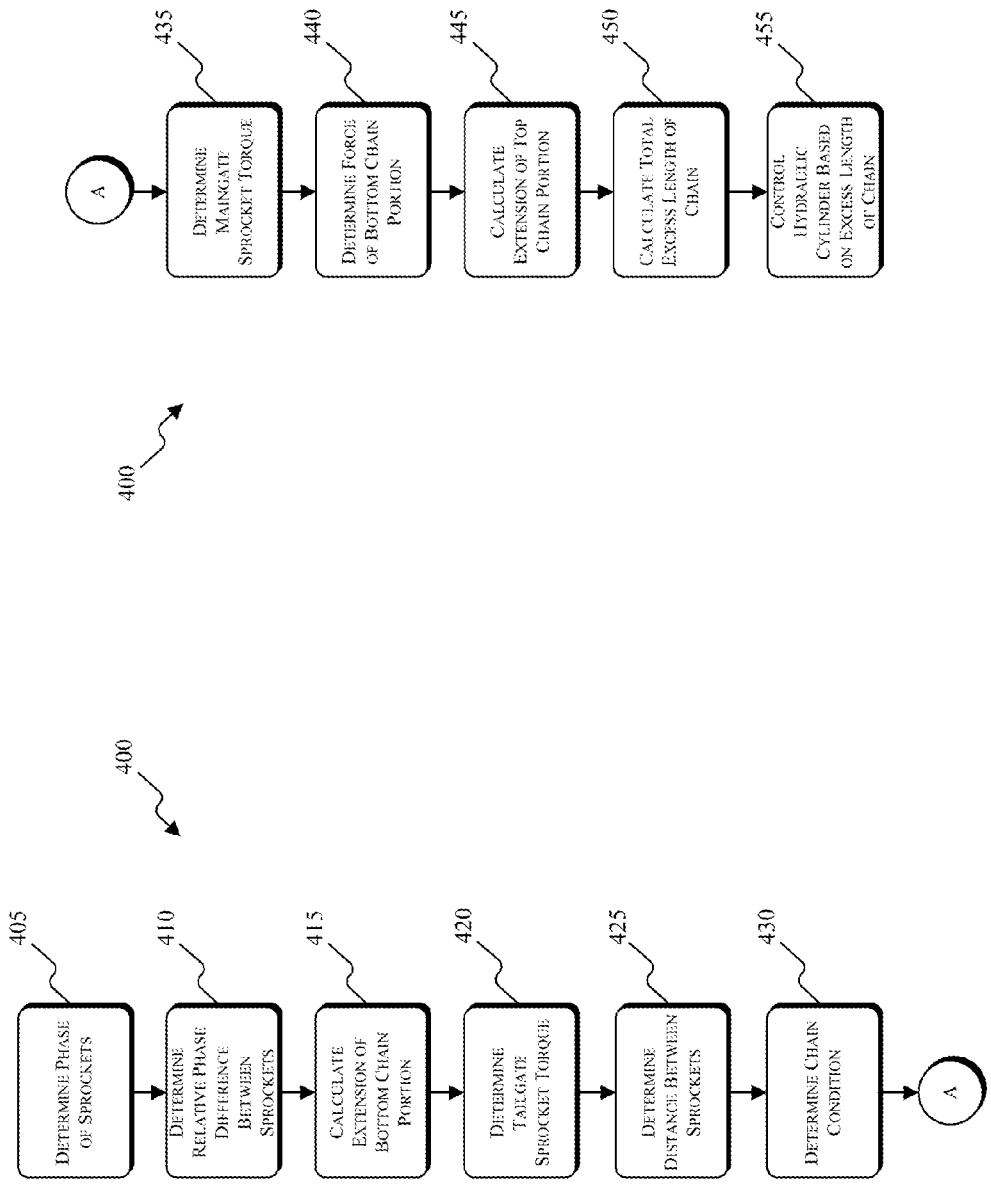
FIG. 10 is a process for controlling an amount of excess chain in a conveyor based on sprocket phase.

A process 400 for calculating or determining the amount of excess chain in the conveyor 100 and correspondingly controlling the distance between two sprockets is provided in FIG. 10. Various steps described herein with respect to the process 400 are capable of being executed simultaneously, in parallel, or in an order that differs from the illustrated serial manner of execution. The process 400 may also be capable of being executed using fewer steps than are shown in the illustrated embodiment.

The process 400 begins with the determination of the phase of the first or maingate sprocket 305 and the second or tailgate sprocket 310 (step 405). The phase or angular position of the first sprocket 305 or the second sprocket 310 can be determined using a tachometer. The tachometer provides a signal to the controller 200 related to an angular distance through which the sprocket has rotated. The angular distance can be measured with respect to the TDC of each sprocket. The angular distance can be determined in radians, degrees, or can be converted to meters (e.g., arc length of rotation). After the phase of each sprocket with respect to TDC has been determined, the relative phase difference between the first sprocket 305 and the second sprocket 310 can be determined or calculated by the controller 200 (step 410). The relative phase difference between the first sprocket 305 and the second sprocket 310 is determined, for example, by subtracting the phase of the first sprocket 305 from the phase of the second sprocket 310. After determining the relative phase difference between the first sprocket 305 and the second sprocket 310, the controller 200 determines or calculates an extension of the bottom portion of the chain 315 (step 415). The extension of the bottom portion of the chain 315 is determined or calculated using EQN 1:

$$E_b = \Delta_{sa}\left(\frac{(\pi D_s)}{360}\right) \qquad \text{EQN. 1}$$

where $E_b$ is the extension of the bottom portion of the chain 315, $\Delta_{sa}$ is the relative difference in phase of the second sprocket 310 relative to the first sprocket 305, and $D_s$ is the chain pitch diameter of the first sprocket 305 and the second sprocket 310. Chain pitch diameter would be understood by one skilled in the art and can be determined according to EQN. 2:

$$D_s = \left(\frac{\text{Pitch} \cdot N}{\pi}\right) + D_w \qquad \text{EQN. 2}$$

where N is the number of teeth on the first sprocket 305 or second sprocket 310, $D_w$ is the diameter of the wire from which the horizontal links of the chain 315 are manufactured, Pitch is the distance or spacing between adjacent pairs of links in the chain 315 (i.e. one chain pitch is the distance between the inside end of one horizontal link to the outside opposite end of its mating vertical link).

After the extension of the bottom portion of the chain has been determined, a torque input of the second or tailgate sprocket 310 is determined (step 420). The input torque of the second sprocket 310, $T_{tg}$, is determined or calculated by the controller 200 based on, for example, a torque sensor, a current sensor, a power transducer, etc., using known techniques. Following step 420, a distance, $L_s$, between the first sprocket 305 and the second sprocket 310 is determined (step 425). The distance, $L_s$, corresponds to the frame closed distance between the first sprocket 305 and the second sprocket 310 in addition to a linear amount of hydraulic ram extension from the hydraulic cylinder 320 and/or the hydraulic cylinder 325. Using the input torque, $T_{tg}$, of the second sprocket, the distance, $L_s$, and the extension of the bottom portion of the chain, $E_b$, a condition of the chain, $C_c$, can be calculated as shown below in EQN. 3 (step 430):

$$C_c = T_{tg}\left(\frac{E_b}{L_s}\right) \qquad \text{EQN. 3}$$

Following step 430, a torque input of the first or maingate sprocket 305 is determined (step 435). The torque input to the first sprocket 305, $T_{mg}$, is determined or calculated by the controller 200 as shown below in EQN. 4:

$$T_{mg} = T_i + F_{bc}\left(\frac{D_s}{2}\right) \qquad \text{EQN. 4}$$

where $T_i$ is the torque input from the motor drive for the first sprocket 305, $F_{bc}$ is the force of the bottom chain portion at the first sprocket 305, and $D_s$ is the chain pitch diameter from EQN. 2 (assuming that the chain pitch diameter of the first sprocket 305 and the second sprocket 310 are the same and determination of a new chain pitch diameter is not needed). The force, $F_{bc}$, of the bottom chain portion at the first sprocket 305 is determined or calculated as the force at the second sprocket 310 minus losses from frictional forces (step 440). The force at the second sprocket 310 can be determined or calculated using the torque input to the second sprocket, $T_{tg}$, and the radius of the sprocket 310. The frictional losses result from, for example, the reaction of the chain 315 to the friction between the bottom chain portion and the flight bars of the conveyor 300, and a bottom raceway of the conveyor 300 pans. In some embodiments, the frictional losses are approximately constant and can be determined during the design of the conveyor 300.

Following the determination or calculation of the torque input to the first sprocket 305 using EQN. 4, the extension of the top portion of the chain, $E_t$, can be calculated or determined as shown below in EQN. 5 (step 445):

$$E_t = C_c\left((T_{mg} \cdot L_1) - \sum_{M=1}^{L_l}\left(\frac{1}{\left(T_{mg} - \left(\frac{T_{mg}}{L_l - M}\right)\right)(L_l - M)}\right)\right) \qquad \text{EQN. 5}$$

where $T_{mg}$ is the torque input to the first sprocket 305, $C_c$ is the condition of the chain (see EQN. 3), and $L_l$ is the distance between the first sprocket 305 and the loading point 340. The distance, $L_l$, between the first sprocket 305 and the loading point 340 can be determined or calculated by the controller 200 based on, for example, the snake loading position of the conveyor and the position of a shearer of the mining system. The distance between the first sprocket 305 and the loading point 340 is calculated using the sequence of EQN. 5 and $L_l$ has units of meters. As shown in EQN. 5, a summation from M=1 to M=$L_l$ of the noted function is used to determine the extension of the top portion of the chain, $E_t$. The loading point 340 is illustrated in FIGS. 4-9 in the same position. However, during normal operation, the loading point 340 of the conveyor will be continuously changing as the shearer moves along a mining face and the conveyor 300 is snake loaded. The process 400 is executed for a plurality of positions of the loading point 340 throughout one operational cycle of the shearer (e.g., the process 400 is executed for each meter of movement of the loading point 340).

Following step 445, the total excess length, $L_{tg}$, of chain at the second sprocket 310 is determined or calculated as the sum of the extension of the bottom portion of the chain, $E_b$, and the extension of the top portion of the chain, $E_t$, as shown below in EQN. 6 (step 450):

$$L_{tg} = E_b + E_t \qquad \text{EQN. 6}$$

After the total excess length of chain, $L_{tg}$, is determined at step 450, the controller 200 controls the linear position of the hydraulic cylinders 320 and/or 325 to modify the relative positions of the first sprocket 305 and the second sprocket 310 (step 455) (e.g., increase the distance between the first sprocket 305 and the second sprocket 310). Modifying or adjusting the distance between the first sprocket 305 and the second sprocket 310 takes up the excess chain, $L_{tg}$, and thereby removes the slack chain 360 described above with respect to FIG. 6. The same process 400 can be used to move the first sprocket 305 and the second sprocket 310 closer to one another (e.g., after loading has been removed from the conveyor 100 and chain tension can be reduced).

Thus, the invention generally provides, among other things, systems and methods for determining an amount of excess chain in a conveyor and correspondingly controlling a relative distance between a first sprocket and a second sprocket based on relative sprocket phase angles. Various features and advantages of the invention are set forth in the following claims.

What is claimed is:

1. A conveyor for a mining system, the conveyor comprising:
   a first sprocket and a second sprocket;
   a chain associated with the first sprocket and the second sprocket;
   a drive mechanism coupled to the first sprocket or the second sprocket, the drive mechanism operable to drive the first sprocket or the second sprocket;
   a first sensor operable to generate a first signal related to an angular position of the first sprocket;
   a second sensor operable to generate a second signal related to an angular position of the second sprocket; and
   a controller including a processor and a memory, the controller operable to
   receive the first signal from the first sensor,
   determine a value for the angular position of the first sprocket based on the first signal,
   receive the second signal from the second sensor,
   determine a value for the angular position of the second sprocket based on the second signal,
   determine a relative difference in phase between the angular position of the first sprocket and the angular position of the second sprocket,
   determine an amount of excess chain in the conveyor based on the relative difference in phase between the angular position of the first sprocket and the angular position of the second sprocket, and
   generate a control signal for controlling a distance between the first sprocket and the second sprocket based on the amount of excess chain.

2. The conveyor of claim 1, wherein the first sensor and the second sensor are tachometers.

3. The conveyor of claim 1, wherein determining the amount of excess chain in the conveyor includes calculating an extension of a bottom portion of the chain and calculating an extension of the top portion of the chain.

4. The conveyor of claim 3, wherein the amount of excess chain is determined as a sum of the extension of the bottom portion of the chain and the extension of the top portion of the chain.

5. The conveyor of claim 3, wherein the extension of the bottom portion of the chain is calculated based on the relative difference in phase between the angular position of the first sprocket and the angular position of the second sprocket.

6. The conveyor of claim 3, wherein the extension of the top portion of the chain is calculated based on a torque associated with the first sprocket and a distance between the first sprocket and a loading point of the conveyor.

7. The conveyor of claim 3, wherein determining the amount of excess chain further includes determining a condition of the chain.

8. The conveyor of claim 7, wherein the condition of the chain is determined based on a torque associated with the second sprocket and the extension of the bottom portion of the chain.

9. The conveyor of claim 1, further comprising a hydraulic cylinder operable for controlling the distance between the first sprocket and the second sprocket, the hydraulic cylinder having a hydraulic cylinder position.

10. The conveyor of claim 9, wherein the controller is further operable to modify the hydraulic cylinder position based on the control signal to control the distance between the first sprocket and the second sprocket.

11. A method of controlling a distance between a first sprocket and a second sprocket in a conveyor of a mining system, the method comprising:
   receiving, at a processor, a first signal from a first sensor related to an angular position of the first sprocket;
   determining, using the processor, a value for the angular position of the first sprocket based on the first signal;
   receiving, at the processor, a second signal from a second sensor related to an angular position of the second sprocket;
   determining, using the processor, a value for the angular position of the second sprocket based on the second signal;
   determining, using the processor, a relative difference in phase between the angular position of the first sprocket and the angular position of the second sprocket;
   determining, using the processor, an amount of excess chain in the conveyor based on the relative difference in phase between the angular position of the first sprocket and the angular position of the second sprocket; and
   generating, using the processor, a control signal for controlling a distance between the first sprocket and the second sprocket based on the amount of excess chain.

12. The method of claim 11, wherein the first sensor and the second sensor are tachometers.

13. The method of claim 11, further comprising calculating an extension of a bottom portion of the chain and calculating an extension of the top portion of the chain.

14. The method of claim 13, further comprising summing the extension of the bottom portion of the chain and the extension of the top portion of the chain to determine the amount of excess chain.

15. The method of claim 13, further comprising calculating the extension of the bottom portion of the chain based on the relative difference in phase between the angular position of the first sprocket and the angular position of the second sprocket.

16. The method of claim 13, wherein the extension of the top portion of the chain is calculated based on a torque associated with the first sprocket and a distance between the first sprocket and a loading point of the conveyor.

17. The method of claim 13, further comprising determining a condition of the chain.

18. The method of claim 17, wherein the condition of the chain is determined based on a torque associated with the second sprocket and the extension of the bottom portion of the chain.

19. The method of claim 17, further comprising modifying a hydraulic cylinder position based on the control signal to control the distance between the first sprocket and the second sprocket.

20. The method of claim 11, wherein the conveyor is an armored face conveyor ("AFC").

* * * * *